United States Patent
Draper et al.

(10) Patent No.: US 9,600,264 B2
(45) Date of Patent: Mar. 21, 2017

(54) GENERATING A CUSTOMIZED SET OF TASKS FOR MIGRATION OF A DEPLOYED SOFTWARE SOLUTION

(71) Applicant: INTERNATIONAL BUSINESS MACHINES CORPORATION, Armonk, NY (US)

(72) Inventors: Christine M. Draper, Austin, TX (US); Ashwin B. Manekar, Morrisville, NC (US); Michael J. McMahon, Apex, NC (US); Renganathan Sundararaman, Cary, NC (US); John W. Sweitzer, Austin, TX (US); Kaylee M. Thomsen, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 114 days.

(21) Appl. No.: 14/526,817

(22) Filed: Oct. 29, 2014

(65) Prior Publication Data
US 2015/0052510 A1  Feb. 19, 2015

Related U.S. Application Data

(63) Continuation of application No. 13/552,626, filed on Jul. 18, 2012, now Pat. No. 8,938,733, which is a
(Continued)

(51) Int. Cl.
G06F 9/445 (2006.01)
G06F 9/44 (2006.01)

(52) U.S. Cl.
CPC ............... *G06F 8/65* (2013.01); *G06F 8/10* (2013.01); *G06F 8/71* (2013.01)

(58) Field of Classification Search
CPC ........ G06F 8/20; G06F 8/60; G06F 17/30297; G06Q 10/06
See application file for complete search history.

(56) References Cited

U.S. PATENT DOCUMENTS 5,794,052 A  8/1998  Harding
5,832,274 A  11/1998  Cutler et al.
(Continued)

OTHER PUBLICATIONS

Notice of Abandonment, mailing date Nov. 17, 2005, U.S. Appl. No. 10/298,355, filed Nov. 18, 2002, In re Bantz, 2 pages.
(Continued)

*Primary Examiner* — Lewis A Bullock, Jr.
*Assistant Examiner* — Gilles Kepnang
(74) *Attorney, Agent, or Firm* — Richard Wilhelm; Amy J. Pattillo

(57) ABSTRACT

A migration set list generator specifies a physical topology of a deployed software solution, wherein the software solution comprises software components and data associated with the software components, integrated into a single entity. The migration set list generator specifies at least one solution change to the deployed software solution to meet at least one business requirement and specifies at least one migration strategy for migrating the deployed software solution. The migration set list generator generates migration tasks for making the at least one solution change to the deployed software solution specified in the physical topology based on the at least one migration strategy and generates a recommended physical topology yielded for the software solution if the physical topology is updated according to the migration tasks.

20 Claims, 6 Drawing Sheets

Related U.S. Application Data continuation of application No. 12/956,094, filed on Nov. 30, 2010, now abandoned.

(56) References Cited

U.S. PATENT DOCUMENTS

| | | | |
|---|---|---|---|
| 6,016,394 A | 1/2000 | Walker | |
| 6,151,608 A | 11/2000 | Abrams | |
| 6,161,176 A | 12/2000 | Hunter et al. | |
| 6,182,285 B1 | 1/2001 | Bleizeffer et al. | |
| 6,199,204 B1 | 3/2001 | Donohue | |
| 6,370,646 B1 | 4/2002 | Goodman et al. | |
| 6,625,622 B1 | 9/2003 | Henrickson et al. | |
| 6,687,902 B1 | 2/2004 | Curtis et al. | |
| 6,698,017 B1 | 2/2004 | Adamovits et al. | |
| 6,701,333 B2 | 3/2004 | Suermondt et al. | |
| 6,735,691 B1 | 5/2004 | Capps et al. | |
| 6,775,673 B2 | 8/2004 | Mahalingam et al. | |
| 6,795,835 B2 | 9/2004 | Ricart et al. | |
| 6,889,376 B1 | 5/2005 | Barritz et al. | |
| 6,963,908 B1 | 11/2005 | Lynch et al. | |
| 6,964,044 B1 | 11/2005 | Hudson et al. | |
| 6,968,370 B2 | 11/2005 | Wu | |
| 6,983,449 B2 | 1/2006 | Newman | |
| 7,036,121 B1* | 4/2006 | Casabona | G06F 8/61 717/173 |
| 7,080,159 B2 | 7/2006 | Chu et al. | |
| 7,080,371 B1 | 7/2006 | Arnaiz et al. | |
| 7,117,486 B2 | 10/2006 | Wong et al. | |
| 7,134,122 B1 | 11/2006 | Sero et al. | |
| 7,191,188 B2 | 3/2007 | Uluakar et al. | |
| 7,346,766 B2 | 3/2008 | Mackin et al. | |
| 7,356,816 B2 | 4/2008 | Goodman et al. | |
| 7,478,361 B2 | 1/2009 | Peteanu et al. | |
| 7,665,085 B2 | 2/2010 | Sundararajan et al. | |
| 7,765,181 B2 | 7/2010 | Thomas et al. | |
| 7,856,631 B2 | 12/2010 | Brodkorb et al. | |
| 7,861,239 B2 | 12/2010 | Mayfield et al. | |
| 8,020,163 B2 | 9/2011 | Nollet et al. | |
| 8,380,667 B2* | 2/2013 | Driesen | G06F 17/30297 707/610 |
| 8,429,645 B2 | 4/2013 | Draper | |
| 2002/0032908 A1 | 3/2002 | Booth | |
| 2002/0112232 A1 | 8/2002 | Ream et al. | |
| 2002/0188625 A1 | 12/2002 | Jans et al. | |
| 2003/0135841 A1 | 7/2003 | Ambrose et al. | |
| 2003/0200274 A1 | 10/2003 | Henrickson et al. | |
| 2004/0044703 A1 | 3/2004 | Wildhagen et al. | |
| 2004/0068715 A1 | 4/2004 | Wong et al. | |
| 2004/0098419 A1 | 5/2004 | Bantz et al. | |
| 2005/0091346 A1 | 4/2005 | Krishnaswami et al. | |
| 2005/0144619 A1 | 6/2005 | Newman | |
| 2007/0067766 A1 | 3/2007 | Tal et al. | |
| 2007/0088630 A1 | 4/2007 | MacLeod et al. | |
| 2007/0220510 A1 | 9/2007 | Bell et al. | |
| 2007/0261049 A1 | 11/2007 | Bankston et al. | |
| 2007/0299975 A1 | 12/2007 | Daschakowsky et al. | |
| 2008/0040714 A1 | 2/2008 | Wheeler et al. | |
| 2008/0071589 A1* | 3/2008 | Laicher | G06Q 10/00 705/35 |
| 2008/0134164 A1 | 6/2008 | Stich et al. | |
| 2008/0140469 A1 | 6/2008 | Iqbal et al. | |
| 2008/0162604 A1 | 7/2008 | Soulet et al. | |
| 2008/0228550 A1 | 9/2008 | Tan et al. | |
| 2008/0255895 A1 | 10/2008 | Rajamony et al. | |
| 2009/0006493 A1 | 1/2009 | Draper et al. | |
| 2009/0007094 A1* | 1/2009 | Hinton | G06F 8/60 717/175 |
| 2009/0012981 A1 | 1/2009 | Kogoh | |
| 2009/0049438 A1 | 2/2009 | Draper et al. | |
| 2009/0070771 A1 | 3/2009 | Yuyitung et al. | |
| 2009/0113413 A1 | 4/2009 | Reinz | |
| 2009/0187880 A1* | 7/2009 | Shields | G06Q 10/06 717/102 |
| 2009/0276771 A1 | 11/2009 | Nickolov et al. | |
| 2010/0031247 A1 | 2/2010 | Arnold et al. | |
| 2010/0088499 A1 | 4/2010 | Zimmer et al. | |
| 2010/0153158 A1* | 6/2010 | Wex | G06Q 10/00 705/7.27 |
| 2010/0153941 A1 | 6/2010 | Borissov et al. | |
| 2010/0223217 A1 | 9/2010 | Little | |
| 2010/0281456 A1* | 11/2010 | Eizenman | G06F 8/20 717/104 |
| 2011/0166849 A1* | 7/2011 | Dube | G06Q 10/10 703/23 |
| 2011/0321025 A1 | 12/2011 | Challa et al. | |
| 2012/0041988 A1* | 2/2012 | Driesen | G06F 17/30297 707/803 |
| 2012/0109844 A1* | 5/2012 | Devarakonda | G06Q 10/067 705/348 |
| 2012/0137278 A1 | 5/2012 | Draper et al. | |
| 2013/0014097 A1 | 1/2013 | Draper et al. | |

OTHER PUBLICATIONS

Office Action, mailing date Mar. 22, 2005, U.S. Appl. No. 10/298,355, filed Nov. 18, 2002, In re Bantz, 14 pages.

IBM System Migration Assistant, accessed online as of Nov. 15, 2002, http://www.pc.ibm.com/us/eseriesxseries/systems_management/sma . . . , 1 page.

PowerQuest DriveCopy 4.0, Technical Specifications, accessed online as of Nov. 15, 2002, http://www.pricegrabber.com/arch_techspecs.php?masterid=449 . . . , 1 page.

Notice of Allowance, mailing date Dec. 21, 2012, U.S. Appl. No. 11/838,274, filed Aug. 14, 2007, In re Draper, 58 pages.

Advisory Action, mailing date Oct. 22, 2012, U.S. Appl. No. 11/838,274, filed Aug. 14, 2007, In re Draper, 4 pages.

Office Action, mailing date Aug. 6, 2012, U.S. Appl. No. 11/838,274, filed Aug. 14, 2007, In re Draper, 41 pages.

Office Action, mailing date May 16, 2012, U.S. Appl. No. 11/838,274, filed Aug. 14, 2007, In re Draper, 37 pages.

Advisory Action, mailing date Mar. 23, 2012, U.S. Appl. No. 11/838,274, filed Aug. 14, 2007, In re Draper, 2 pages.

Applicant Initiated Interview Summary, mailing date Feb. 24, 2012, U.S. Appl. No. 11/838,274, filed Aug. 14, 2007, In re Draper, 3 pages.

Office Action, mailing date Jan. 17, 2012, U.S. Appl. No. 11/838,274, filed Aug. 14, 2007, In re Draper, 26 pages.

Interview Summary, mailing date Aug. 1, 2011, U.S. Appl. No. 11/838,274, filed Aug. 14, 2007, In re Draper, 3 pages.

Office Action, mailing date May 11, 2011, U.S. Appl. No. 11/838,274, filed Aug. 14, 2007, In re Draper, 25 pages.

Notice of Allowance, dated Jul. 9, 2013, U.S. Appl. No. 12/956,094, filed Nov. 30, 2010, In re Draper, 28 pages.

Office Action, dated Dec. 26, 2012, U.S. Appl. No. 12/956,094, filed Nov. 30, 2010, In re Draper, 36 pages.

Office Action, dated May 7, 2014, U.S. Appl. No. 13/552,626, filed Jul. 18, 2012, In re Draper, 72 pages.

Notice of Allowance, dated Sep. 10, 2014, U.S. Appl. No. 13/552,626, filed Jul. 18, 2012, In re Draper, 20 pages.

\* cited by examiner

GENERATING A CUSTOMIZED SET OF TASKS FOR MIGRATION OF A DEPLOYED SOFTWARE SOLUTION

CROSS REFERENCE TO RELATED APPLICATIONS

This application is a continuation of commonly assigned U.S. patent application Ser. No. 13/552,626, filed Jul. 18, 2012, which is a continuation of U.S. patent application Ser. No. 12/956,094, filed Nov. 30, 2010, which are both hereby incorporated herein by reference.

BACKGROUND OF THE INVENTION

1. Technical Field

This invention relates in general to computer software solutions, and more particularly, to generating a customized set of tasks for migration of a deployed software solution.

2. Description of Related Art

Many business enterprises spend considerable resources assessing information technology (IT) needs and deploying a software solution into an IT environment to meet these IT needs. In one example, a software solution refers to a total solution of integrated software components and associated data. IT needs, however, are constantly evolving and at the same time the size, speed, complexity, and other factors associated with an IT environment may change. Thus, once a software solution is deployed for an enterprise client, the enterprise client is likely to need to update any or all of the integrated software components that comprise the software solution.

Updating a deployed software solution that has been customized for an enterprise client introduces multiple issues for the enterprise client because updating a software solution typically requires migration of one or more components of the deployed software solution. One issue for enterprise clients in migrating a deployed software solution is that migration of software components is made more complex when one or more software components of a software solution are dependent upon one another and when differing upgrade approaches are required for each individual software component of a software solution. In addition, each enterprise client will encounter different issues associated with downtimes, new hardware requirements, and moving users from a deployed software solution to an updated software solution, when migrating a deployed software solution. Moreover, an enterprise client may invest considerable resources into deploying a software solution and need to protect the investment in these resources when migrating the deployed software solution without incurring significant additional costs associating with updating the software solution. There is not a single way to meet the needs of all enterprise clients who need to update software solutions, however, it may be necessary for an enterprise client to migrate deployed software solutions to protect the investment made in the software solution and to grow the software solution to fit ever-changing needs.

BRIEF SUMMARY

In view of the foregoing, there is a need for generating at least one customized set of tasks, which if followed, are predicted to provide a successful migration of a deployed software solution for an enterprise. In particular, there is a need for generating a customized set of tasks for migrating a deployed software solution for an enterprise client, given the current physical topology of the existing deployed software solution, including dependencies between components of the software solution, and taking into account the desired changes to the software solution by the particular enterprise client, the enterprise client's migration strategies for making these changes, and the best practices approach for upgrading each particular software component in the software solution.

In one embodiment, a method for generating a set of tasks for performing a migration of a software solution is directed to specifying a physical topology of a deployed software solution, wherein the software solution comprises software components and data associated with the software components integrated into a single entity. The method is directed to specifying at least one solution change to the deployed software solution to meet at least one business requirement. The method is directed to specifying at least one migration strategy for migrating the deployed software solution, wherein the at least one migration strategy comprises at least one of a product level strategy specified for a particular software component of the software components and at least one solution level strategy specified for the software components, wherein the product level strategy overrides the solution level strategy for the particular software component. The method is directed to generating migration tasks for making the at least one solution change to the deployed software solution specified in the physical topology based on the at least one migration strategy. The method is directed to generating a recommended physical topology yielded for the software solution if the physical topology is updated according to the migration tasks. The method is directed to outputting the migration tasks and recommended physical topology for providing a simulated plan for migrating the software solution according to the at least one migration strategy to meet the at least one business requirement.

In another embodiment, a computer system for generating a set of tasks for performing a migration of a software solution comprise a migration task list generator coupled to at least one processor and memory. The migration set list generator is programmed to specify a physical topology of a deployed software solution, wherein the software solution comprises software components and data associated with the software components integrated into a single entity. The migration set list generator is programmed to specify at least one solution change to the deployed software solution to meet at least one business requirement. The migration set list generator is programmed to specify at least one migration strategy for migrating the deployed software solution, wherein the at least one migration strategy comprises at least one of a product level strategy specified for a particular software component of the software components and at least one solution level strategy specified for the software components, wherein the product level strategy overrides the solution level strategy for the particular software component. The migration set list generator is programmed to generate migration tasks for making the at least one solution change to the deployed software solution specified in the physical topology based on the at least one migration strategy. The migration set list generator is programmed to generate a recommended physical topology yielded for the software solution if the physical topology is updated according to the migration tasks. The migration set list generator is programmed to output the migration tasks and recommended physical topology for providing a simulated plan for migrating the software solution according to the at least one migration strategy to meet the at least one business requirement.

In another embodiment, a computer program product for generating a set of tasks for performing a migration of a software solution comprises a computer readable storage medium having program instructions embodied therewith. The program instructions are executable by a processor to specify a physical topology of a deployed software solution, wherein the software solution comprises software components and data associated with the software components integrated into a single entity. The program instructions are executable by a processor to specify at least one solution change to the deployed software solution to meet at least one business requirement. The program instructions are executable by a processor to specify at least one migration strategy for migrating the deployed software solution, wherein the at least one migration strategy comprises at least one of a product level strategy specified for a particular software component of the software components and at least one solution level strategy specified for the software components, wherein the product level strategy overrides the solution level strategy for the particular software component. The program instructions are executable by a processor to generate migration tasks for making the at least one solution change to the deployed software solution specified in the physical topology based on the at least one migration strategy. The program instructions are executable by a processor to generate a recommended physical topology yielded for the software solution if the physical topology is updated according to the migration tasks. The program instructions are executable by a processor to output the migration tasks and recommended physical topology for providing a simulated plan for migrating the software solution according to the at least one migration strategy to meet the at least one business requirement.

BRIEF DESCRIPTION OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION OF THE PREFERRED EMBODIMENTS

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art that the present invention may execute in a variety of systems, including a variety of computer systems and electronic devices operating any number of different types of operating systems.

Figure 1:
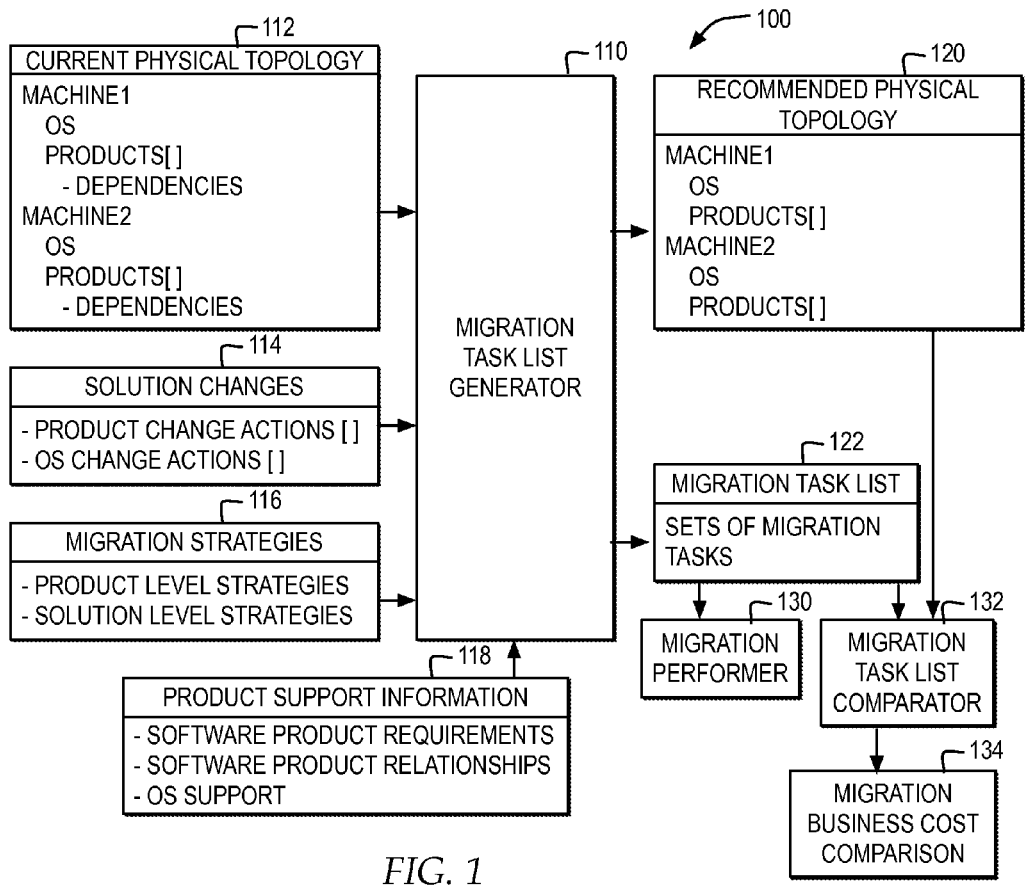
FIG. 1 illustrates a block diagram of a migration task list generator system.

FIG. 1 illustrates a block diagram of a migration task list generator system. In the example, a migration task list generator system 100 includes a migration task list generator 110. Within migration task list generator system 100, migration task list generator 110 receives multiple types of information specified for an enterprise client's deployment needs including, but not limited to, a current physical topology 112 describing the current deployment specification of a software solution, solution changes 114 specifying the actions that an enterprise client needs to be performed to update a deployed software solution, migration strategies 116, and product support information 118. In addition, within migration task list generator system 100, migration task list generator 110 generates a migration task list 122 of the customized set of tasks recommended for migration of a deployed software solution and a recommended physical topology 120 illustrating a simulation of what the software solution topology would look like after the migration occurs if the customized set of tasks in migration task list 122 are followed.

As described herein, a software solution refers to one or more integrated software components and the data associated with the software components. In one example, one or more software components of a software solution are integrated by being dependent upon one another for the software solution or by one software component being a prerequisite to one or more other software components. In one example, the software components and data associated with the software components of a software solution include multiple functions and data elements, but are viewed as a single entity. A software component may include, but is not limited to, an operating system, a software product, and a database. Each software component within a software solution is identified by one or more types of identifiers including, but not limited to, a unique alphanumeric identifier, a product or component identifier, and a version identifier. The software components and associated data are implemented within one or more layers of a software protocol stack including, but not limited an application layer, a middleware layer, and a network layer. In addition, the software components and associated data of a software solution may operate within a single machine or distributed across multiple machines communicatively connected via a network.

As described herein, migration refers to the process of moving hardware, software components, associated data, and other elements of a deployed software solution within a computing environment. In one example, migration refers to the movement required for upgrading one or more software components of a deployed software solution. In another example, migration refers to the movement required for moving a software component and associated data of a deployed software solution from one machine to a new machine. In yet another example, migration refers to the movement required for adding a new type of software component to a deployed software solution or removing a software component from a deployed software solution. Moreover, migration may include a combination of changes to a deployed software solution including, but not limited to, moving one or more software components to a new machine, upgrading a software component and moving the software component to a new machine, and running a current version of a software component on a current machine and moving an upgraded version of the software component to a new machine.

When an enterprise client with a deployed software solution needs to update the software solution there are multiple problems and issues that need to be considered in determining whether to perform the upgrade and for selecting an approach for updating the deployed software solution that adapts for the customization of the software solution and also protects the investment the enterprise client has made in the deployed software solution. The general problems that may arise when updating a deployed software solution include, but are not limited to, the dependencies between software components of a software solution that increase the complexity of upgrading software components, the downtime that can occur during a software solution update, the different approaches to an upgrade required by different software components of a software solution, and the costs associated with adding new hardware and actually performing the update of the software solution. Migration task list generator system 100 generates migration task list 122 of the customized set of tasks recommended for performing the migration of a deployed software solution and recommended physical topology 120 illustrating a simulation of what the software solution topology would look like after the migration occurs if the customized set of tasks in migration task list 122 are followed, for a manager of an enterprise client software solution to use as a guide for evaluating whether to perform the update, as a guide for evaluating the necessary hardware and time requirements for performing the update, and as a guide for performing a software solution update either step by step or through an automated migration performer 130. By specifying current physical topology 112, the dependencies between software components of a software solution are mapped and migration task list 122 includes a set of migration tasks for migrating dependent software components. By specifying migration strategies, 116 the manager selects an approach to update the software solution, from among multiple migration strategies, at both the solution and product levels, where each migration strategy has a different downtime effect, different hardware requirements, and different steps for switching users to the updated software solution, and migration task list 122 includes a set of migration tasks for migrating the software solution according to the selected migration strategy. By specifying solution changes 114, an enterprise client specifies one or more components to update within a software solution, to customize the selection of components of a software solution to be updated according to the enterprise client's business needs. By accessing product support information 118, best practices for one or more product components of a software solution are applied when generating the set of migration tasks in migration task list 122. As described herein, an enterprise client may refer to any user, group of users, business, or other entity. As described herein, an enterprise client's business requirement may include, but is not limited to, a business goal, an IT change requirement or goal, or a desire to update a currently deployed software solution.

In particular, in FIG. 1, examples of details of the deployed software solution are mapped out, as illustrated in current physical topology 112. In the example, current physical topology 112, specified for an enterprise client software solution, includes one or more machines, such as "machine 1" and "machine 2", with at least one operating system (OS) and one or more software products "products [ ]" deployed on each machine as part of the software solution. Current physical topology 112 may also be referred to as the "as-is" topology. As illustrated, migration task list generator 110 generates a recommended physical topology 120, specifying a recommended physical topology of the enterprise client software solution being updated. In the example, recommended physical topology 120 includes one or more machines, such as "machine 1" and "machine 2", with multiple software components illustrated by at least one operating system (OS) and one or more software products "products [ ]". Each "machine" illustrated within current physical topology 112 and recommended physical topology 120 may represent one or more computer systems, such as computer system 200 illustrated in FIG. 2, and may represent multiple computing systems or computer resources communicatively connected via a network. While in the example current physical topology 112 and recommended physical topology 120 are each displayed as including two machines, in another examples, each of current physical topology 112 and recommended physical topology 120 may include additional or alternate machines and current physical topology 112 and recommended physical topology 120 may include different numbers or types of machines from one another.

In addition to specifying details of the deployed software solution at the machine level and the software component level within current physical topology 112, details about the dependencies between one or more software components or between the data associated with one or more software components, are specified, as indicated by "dependencies" for each of the software products "products [ ]". In one example of a dependency, software product A depends on a database product X to store its application data, therefore current physical topology 112 will include a mapped dependency between software product A and database product X, such that migration task list generator 110 will determine whether database product X also needs to be upgraded if product A is upgraded from a current version to a newer version. In another example of a dependency, software product Z is a shared prerequisite for product X and product Y, such that if product X needs to be upgrade, migration task list generator 110 will determine whether product Z needs to be upgraded as well and will also determine what tasks need to be performed to maintain a version of product Z for use with product Y.

In the example, solution changes 114 includes one or more types of software solution changes desired by an enterprise client to the components of a software solution including, but not limited to, product change actions and operating system (OS) change actions. In one example, a product change action specifies one or more software products to upgrade. In another example, a product change action specifies one or more software products to add and integrate within a software solution, to replace within a software solution, or to remove from a software solution.

In specifying solution changes 114, there is a need to understand the business requirements for updating an existing software solution to maintain or improve the value of a software solution and to articulate the specific changes to the deployed software solution needed to be performed to achieve these business requirements. In one example, the business requirement for updating a deployed software solution may be the business need to add monitoring capabilities to an existing solution, which would require a change of adding a software product in solution changes 114, such as by specifying "software product Z needs to be added and integrated into the existing software solution to provide a new solution-level capability." In another example, the business requirement for updating a deployed software solution may be the business need to implement a function available in a newer version of a software product that is already deployed, which would require a change of upgrading a software product in solution changes 114, such as by specifying "software product A needs to be upgraded from version 6 to version 7 to take advantage of a new product capability."

In determining migration task list 122, migration task list generator 110 takes into account any preferred update approach specified by a manager of the software solution in solution changes 114 and also takes into account available best practices for updating each of the software components of the software solution, if specified. In the example, migration task list generator 110 accesses best practices for one or more of the software components, as illustrated by product support information 118. Product support information 118 includes one or more types of information about one or more of the software components implemented within deployed within an existing software solution and about the components that would be implemented within an upgraded software solution. In the example, product support information 118 includes, but is not limited to, software product requirements, software product relationships, and OS support for one or more software products of the existing software solution, which specify the best practices for upgrading the one or more software products.

In one example, if product support information 118 includes a best practice approach for a software component being upgraded, migration task list generator 110 will validate solution changes 114 using product support information 118 and flag issues that may arise given the best practice approach and the specific changes requested in solution changes 114. For example, if a software product A in the deployed software solution is set for upgrade in solution changes 114 and software product A is dependent upon software product B in the deployed software solution, product support information 118 specifies whether software product B needs to be upgraded if software product A is upgraded. If software product B needs to be upgraded if software product A is upgraded, then to validate the upgrade of software product A, migration task list generator 110 will specify the tasks needed to be taken to upgrade software product B as well.

Next, in determining migration task list 122, migration task list generator 110 takes into account the migration strategies specified for an enterprise client in migration strategies 116. Migration strategies 116 include one or more levels of strategies specified by the enterprise client for managing software solution migration including, but not limited to, product level strategies, specified for one or more software products, and solution level strategies, specified for the software solution. In one example, a solution level strategy will be applied by migration task list generator 100 to all software products of a software solution, however product level strategies override the solution level strategy on a product-by-product basis. A first example of a migration strategy is migrating a software product in place, or "migrate in place", as further described in FIG. 4. A second example of a migration strategy is migrating a software product by offloading the current data associated with the software product, installing a new version of the software product on a new machine, and migrating the current data over to the new version installation, or "install new and migrate data", as further described in FIG. 5. A third example of a migration strategy is running an old version of the software product and a new version of the software product in parallel, or "run old and new", as further described in FIG. 6. With the third example of a migration strategy, further specification of the strategies includes specifying how the data associated with the software product is upgrading including, but is not limited to, one or more of keeping separate copies of the old and new data in sync, sharing a single data source between the old and new, and having two distinct copies of the data that do not need to be kept in sync.

In selecting migration strategies 116, it is important to understand the business needs of the enterprise client that are effected by the type of migration strategy selected. In particular, each migration strategy has an associated downtime for the software solution during the migration and an associated approach to moving users over to the updated software solution.

Figure 4:
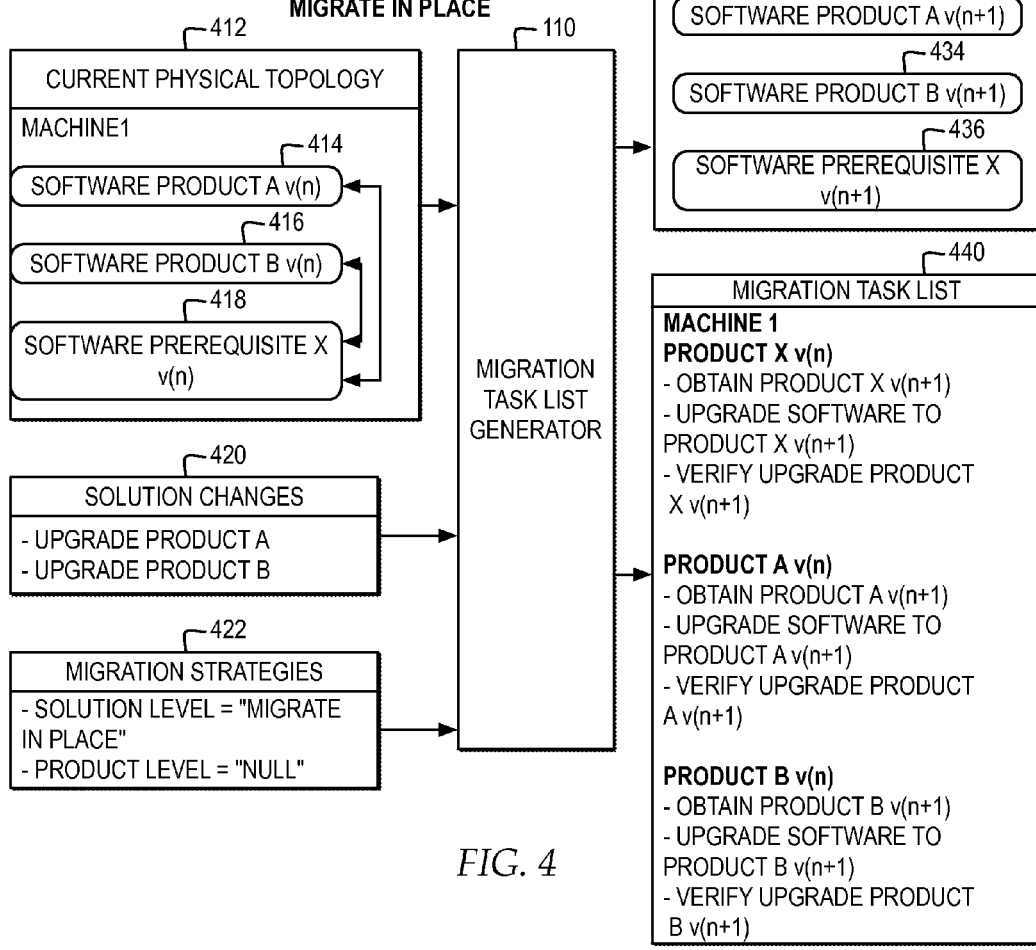
FIG. 4 depicts a block diagram illustrating a customized set of tasks for an enterprise client migration software solution level strategy of migrating the software solution in place.

In one example, if downtime is not an issue because the software solution does not have requirements to be always available, then a migration strategy of "migrate in place" can be selected, as further described in FIG. 4, which brings down a software solution deployed on a selection of machines, applies solution changes to the existing selection of machines, and then restarts the solution. A "migrate in place" solution reduces the hardware required for an enterprise client to update a deployed software solution.

Figure 5:
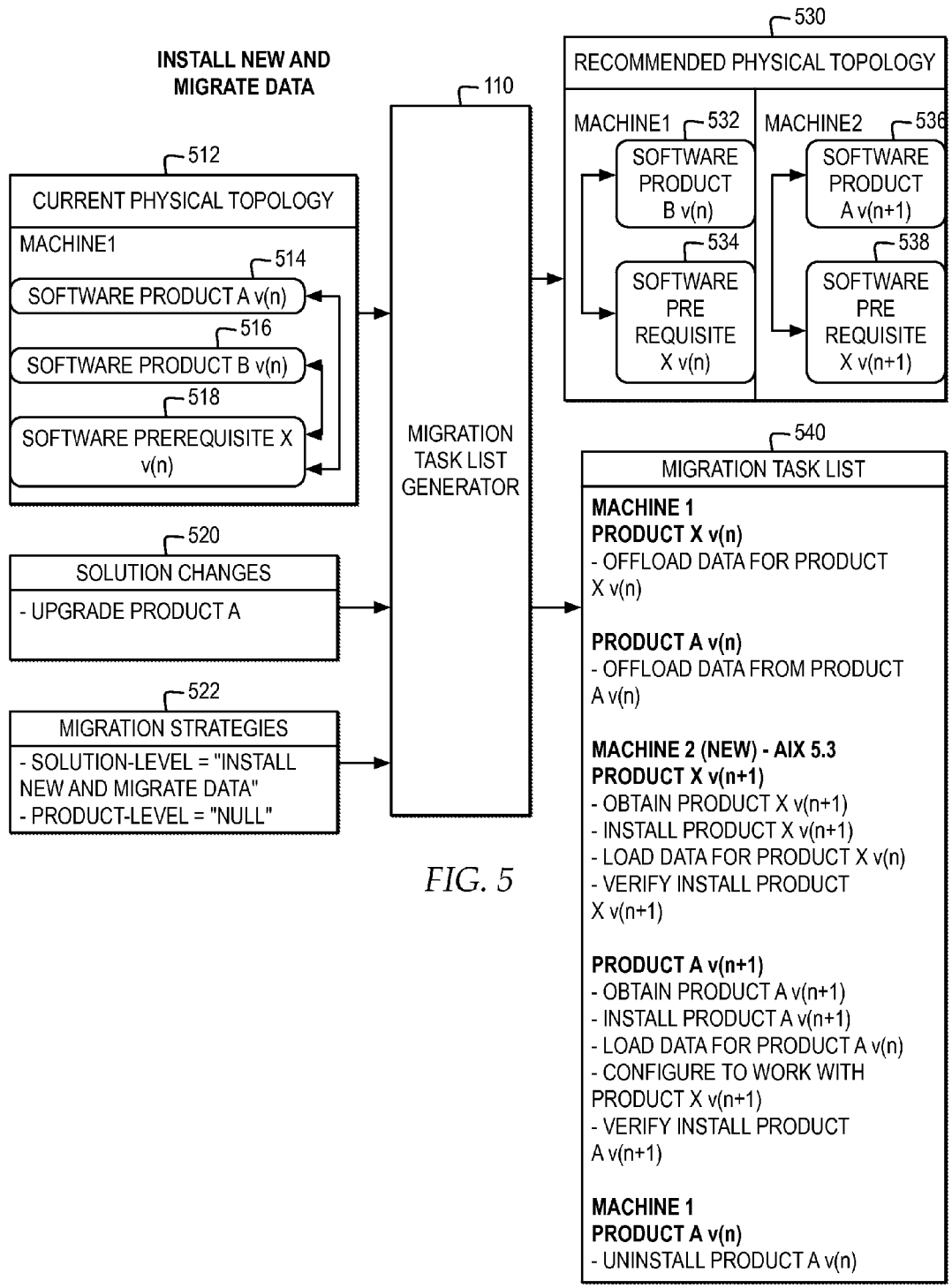
FIG. 5 illustrates a block diagram depicting a customized set of tasks for an enterprise client migration software solution level strategy of install new and migrate data.
Figure 6:
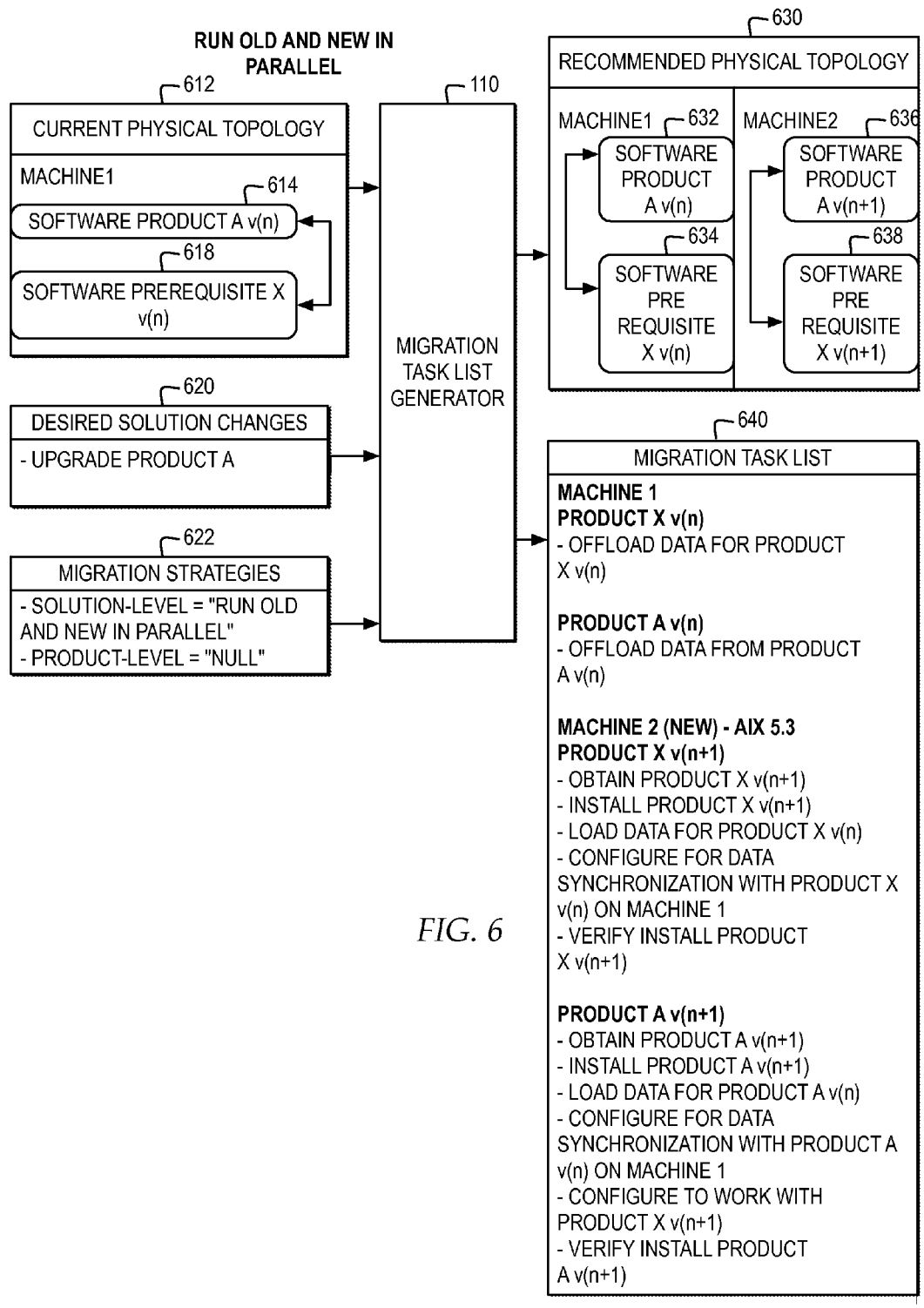
FIG. 6 depicts a block diagram illustrating a customized set of tasks for an enterprise client migration software solution level strategy of run the old and new version of a software solution in parallel.

In another example, if downtime is an issue because the software solution is required to be always available, then a migration strategy may be selected that involves installing one or more components of the updated software solution on a new set of machines to minimize the impact to the existing software solution, such as by an "install new and migrate data", as further described in FIG. 5, or "run old and new in parallel" strategy, as further described in FIG. 6.

In yet another example, if downtime is an issue for only a first selection of components of the software solution required to be always available, but not an issue for a second selection of components, then a product level migration strategy may be selected for the first selection of components that must always be available to install the upgrades to the first selection of components on a new set of machines, with a solution level migration strategy selected for the second selection of components to install the upgrades on the existing machines, such that downtime is reduced for the first selection of components, but new hardware requirements are reduced for the second selection of components.

Migration task list generator 110 generates migration task list 122, which includes one or more sets of tasks, which if followed, are predicted to provide a successful upgrade of the software solution deployed in current physical topology 112 and yielding the recommended physical topology 120. In particular, migration task list 122 includes one or more sets of tasks that apply migration strategies 116 to the software solution described in current physical topology 112 to perform the changes requested in solution changes 114, according to the dependencies of the software products in the software solution and the best practice approach for each of the software products in the software solution as specified in product support information 118.

By migration task list generator 110 generating recommended physical topology 120, also referred to as the "to-be" software solution deployment topology, a manager of the software solution can view what the software solution would look like after all changes specified in solution changes 114 are made, according to the migration strategies specified in migration strategies 116 and the best practices specified in product support information 118. In addition, by migration task list generator 110 generating migration task list 122, a manager of the software solution can view what steps would be required to update a software solution according to the selected product level and solution level migration strategies. In view of the recommended physical topology 120 and migration task list 122, an enterprise client manager may evaluate whether, given the enterprise client's current needs, to perform the update specified in migration task list 122. If an enterprise client decides to perform the update specified in migration task list 122, migration task list 122 provides the enterprise client with a step-by-step guide to the necessary hardware and migration steps required, such that the enterprise client can properly assemble all necessary hardware for the migration and efficiently schedule the migration to minimize the effects of any downtimes.

By assembling all necessary hardware for the migration and efficiently scheduling the migration according to migration task list 122, prior to performing the migration, an enterprise client may reduce the technical support and labor costs for performing the migration. In addition, by assembling all necessary hardware for the migration and efficiently scheduling the migration according to migration task list 122, prior to performing the migration, an enterprise client may experience fewer errors from updated software solutions, which protects the enterprise client's investment in the software solution.

In the example, a manager of an enterprise client software solution, after reviewing migration task list 122 and recommended physical topology 120, may elect to perform to add any new required hardware and may elect to select functions which would perform the steps in migration task list 122. In addition, a manager of an enterprise client software solution, may select to send migration task list 122 to migration performer 130. Migration performer 130 will automatically perform the tasks specified in migration task list 122, yielding the recommended physical topology 120 for an updated software solution.

In addition, migration task list system 100 may include migration task list comparator 132 that receives multiple instances of migration task list 122 and recommended physical topology 120, each specified with different solution changes 114 or different migration strategies 116. Migration task list comparator 132 compares the different instances of migration task list 122 and recommended physical topology 120, analyzes the differences in hardware requirements, costs, performance requirements, downtime requirements, user movement requirements, and other factors, and outputs a migration business cost comparison 134 that specifies the differences in hardware requirements, downtime requirements, user movement requirements, and other factors, such that a manager of a software solution receives an evaluation of the business costs associated with implementing difference solution changes or different migration strategies for a deployed software solution.

In one example, migration task list comparator 132 may analyze the differences in cost, hardware requirements, performance yields, network loading, downtime requirements, user movement requirements and other factors, in addition to the changes in these factors over time, for different migration strategies, for different solution level and product level requirements, and for different tasks, and generate migration business cost comparison 134 with a list of preferred migration strategy combination approaches for a particular enterprise client. To perform the analysis, migration task list comparator 132 may gather information about current and new hardware costs, performance costs, network loading, downtime costs, user movement costs, network performance, specific task costs and other information, from a database. In addition, migration task list comparator 132 may store historical data about the actual costs of implementing tasks performed to install or upgrade a software solution, on a task and software component level, and the actual costs of running a software solution, such as the actual number of hours taken to upgrade a software component, which migration task list comparator 132 applies when analyzing different migration strategies, including different strategies at the solution level and product level. Further, migration task list comparator 132 may prompt a manager to provide information about the actual business costs of performing specific tasks including, but not limited to, the estimated business revenue or productivity lost during solution downtimes, the estimated cost for each type of new machine, and the estimated cost per year of maintaining new machines.

In one example, migration business cost comparison 134 may include a comparison of differences for two or more software components that interact with one another migrating on a same machine versus splitting the software components into different machines and may also consider the differences between solutions over time based on different factors. For example, software components that interact with one another on the same machine communicate via Inter-process communication (IPC) in comparison with components on different machines communicating via Transmission Control Protocol/Internet Protocol (TCP/IP) network communication. Migrating components to different machines, such as through an "install new" migration strategy, may place a significant load on a network over time due to load from the TCP/IP based network communications between software components on different machines, such that even if a network will experience a temporary performance degradation by applying a "migrate in place" migration strategy, migration business cost comparison 134 may determine that it is more beneficial for the particular enterprise client to apply a "migrate in place" migration strategy at the solution and product levels and experience a temporary period of downtime for the machine, and the performance on the network to be degraded for the temporary period, in order to gain improved long-term communication load efficiency through Inter-Process Communication over TCP/IP network communication. In another example, however, migration business cost comparison 134 may also include an analysis of the CPU load requirements for each software component and determine that in the long-term, the cost of new hardware and the communication load due to the TCP/IP based network communications between software components on different machines are worth the improved performance for the particular enterprise client by applying an "install new" migration strategy at the solution and product levels and splitting the CPU load for one or more software components between multiple CPUs on different machines.

In another example, migration business cost comparison 134 may include a comparison of the costs and performance differences between migrating a software solution, as specified at the solution and product levels, in place versus migrating the software solution, as specified at the solution and product levels, to a new machine with additional performance capabilities, such as faster CPUs, more CPUs, more memory, and faster network cards. In particular, migration business cost comparison 134 may include a first cost of the new machine compared with a second calculated cost representing the cost over a particular period of time of lost processing, memory, or network bandwidth by not migrating the software solution, specified at the solution and product levels.

In another example, migration business cost comparator 132 may detect when migration performer 130 is performing a migration and prompt a manager to enter a total amount of personnel time required to upgrade each task, by software component as the migration is performed, and store these times. Migration business cost comparator 132 may then estimate the upgrade cost for future migrations for on a task by task and on a component by component basis.

Figure 2:
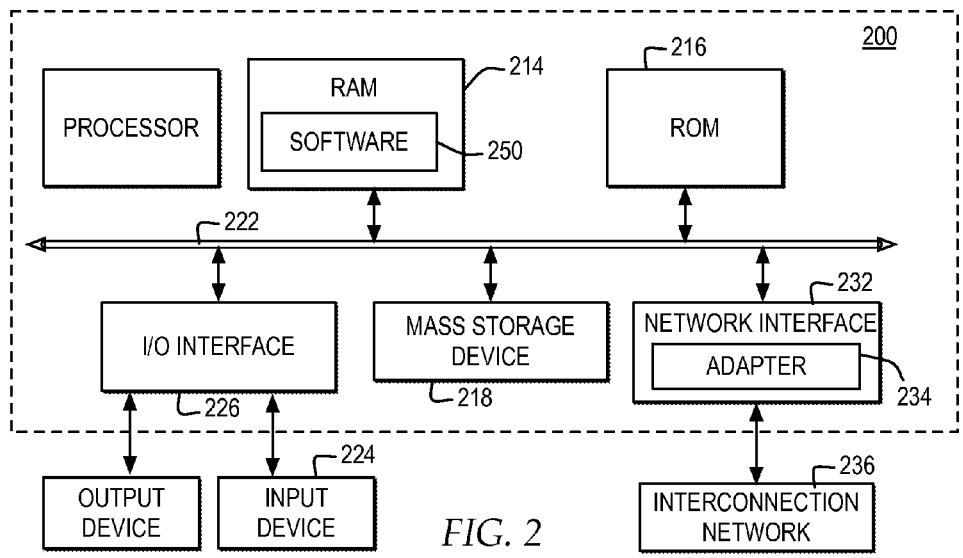
FIG. 2 depicts one example of a computer system in which the invention may be implemented.

FIG. 2 depicts one example of a computer system in which the invention may be implemented. The present invention may be performed in a variety of systems and combinations of systems, made up of functional components, such as the functional components described with reference to computer system 200 and may be communicatively connected to a network, such interconnection network 236.

Computer system 200 includes a bus 222 or other communication device for communicating information within computer system 200, and at least one hardware processing device, such as processor 212, coupled to bus 222 for processing information. Bus 222 preferably includes low-latency and higher latency paths that are connected by bridges and adapters and controlled within computer system 200 by multiple bus controllers. When implemented as a server or node, computer system 200 may include multiple processors designed to improve network-servicing power. Where multiple processors share bus 222, additional controllers (not depicted) for managing bus access and locks may be implemented.

Processor 212 may be at least one general-purpose processor such as IBM's PowerPC (PowerPC is a registered trademark of International Business Machines Corporation) processor that, during normal operation, processes data under the control of software 250, which may include at least one of application software, an operating system, middleware, and other code and computer executable programs accessible from a dynamic storage device such as random access memory (RAM) 214, a static storage device such as Read Only Memory (ROM) 216, a data storage device, such as mass storage device 218, or other data storage medium. Software 250 may include, but is not limited to, code, applications, protocols, interfaces, and processes for controlling one or more systems within a network including, but not limited to, an adapter, a switch, a cluster system, and a grid environment. Moreover, software 250 may be viewed as part of a software solution, may include components, which are part of different software solutions, or may access one or more software solutions.

Figure 8:
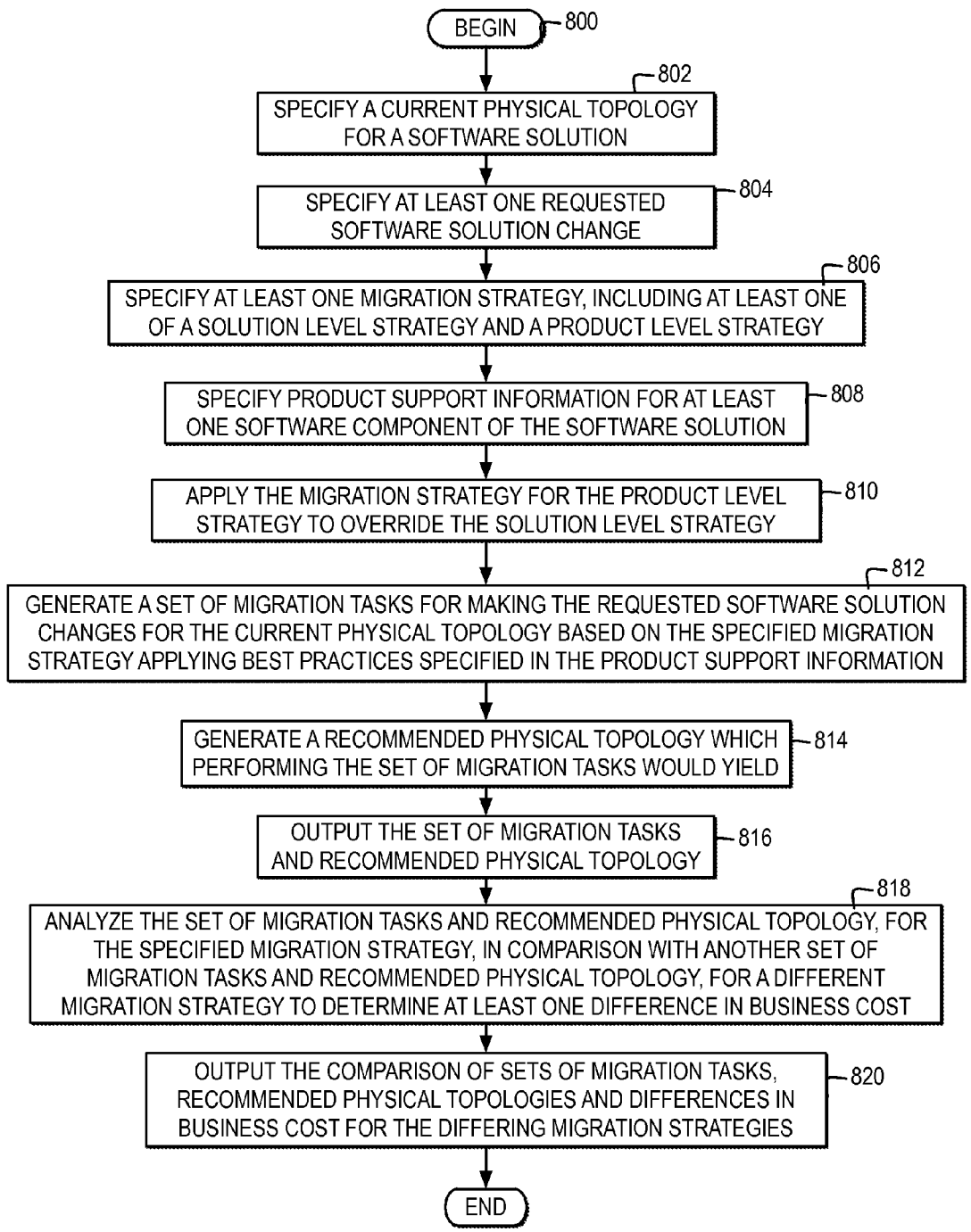
FIG. 8 depicts a high level logic flowchart of a process and program for generating a customized set of tasks for migration of a deployed software solution.

In one embodiment, the operations performed by processor 212 may control the operations of flowchart of FIG. 8 and other operations described herein. Operations performed by processor 212 may be requested by software 250 or other code or the steps of the present invention might be performed by specific hardware components that contain hard-wired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 218, a random access memory (RAM), such as RAM 214, a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server. In the latter scenario, the remote computer may be connected to the user's computer through any type of network, such as interconnection network 236, through a communication interface, such as network interface 232, over a network link that may be connected, for example, to interconnection network 236.

In the example, network interface 232 includes an adapter 234 for connecting computer system 200 to interconnection network 236 through a link. Although not depicted, network interface 232 may include additional software, such as device drivers, additional hardware and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 232, the network link to interconnection network 236, and interconnection network 236 may use electrical, electromagnetic, or optical signals that carry digital data streams. The signals through the various networks and the signals on interconnection network 236, the network link to interconnection network 236, and network interface 232 which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, an image scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
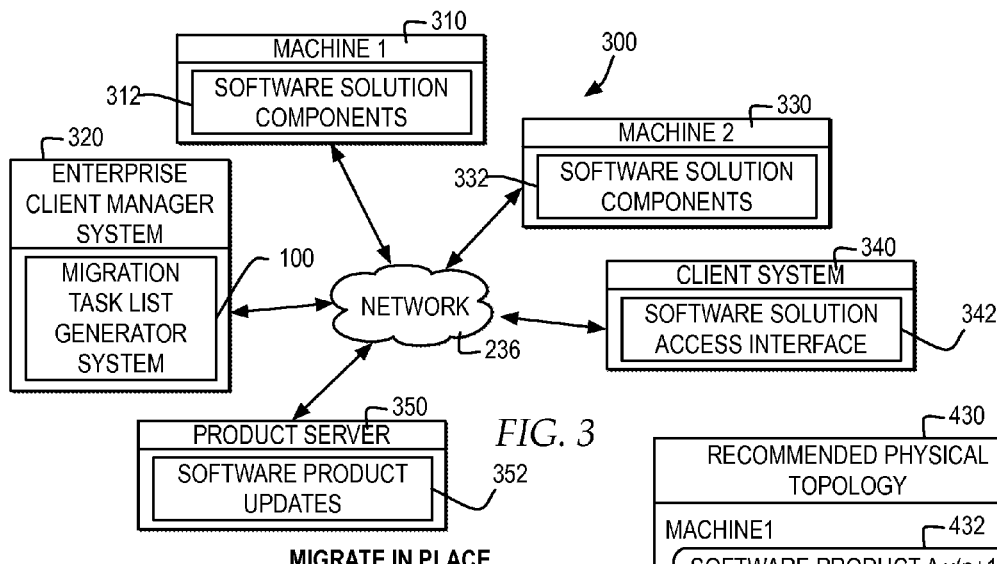
FIG. 3 illustrates a block diagram of a network environment for generating a migration task list for an enterprise client for migration of a deployed software solution.

FIG. 3 illustrates a block diagram of a network environment for generating a migration task list for an enterprise client for migration of a deployed software solution. In the example, a network environment 300 includes interconnection network 236 for communicatively connecting multiple systems. In the example, interconnection network 236 communicatively connects a machine 1 310, a machine 2 330, an enterprise client manager server 320 a client system 340, and a product server 350. Network 236 may include, but is not limited to, packet-switching networks, such as the Internet or an intranet, and telephony networks. In addition, network 236 may include routers, switches, gateways, and other hardware to enable a communication channel between one or more systems. While in the example machine 1 310, a machine 2 330, an enterprise client manager server 320, a client system 340, and a product server 350 are depicted as communicating via network 236, in an alternate embodiment, one or more of the systems may be incorporated within network 302.

In the example, machine 1 310 represents one or more computing systems, such as computer system 200, with software solution components 312 deployed on machine 1 310. Machine 2 330 represents one or more computing systems, such as computer system 200, with software solution components 332 deployed on machine 2 330. Software solution components 312 and 332 include one or more software components of one or more software solutions, such as OS and software products as illustrated in current physical topology 112.

In one example, machine 1 310 and software solution components 312 and machine 2 330 and software solution components 332 are elements of a software solution accessed by client system 340 through a software solution access interface 342, such as a browser, email client, or other interface through which a user accesses the entity represented by a software solution. Since one or more users access the software solution via one or more client systems, such as client system 340, when an enterprise client decides to update a deployed software solution, which may be accessed by multiple users, there is a need to generate a customized set of tasks for updating the deployed software solution optimized for both solution level and product level strategies selected for the enterprise client for migration of the deployed software solution with minimized interruption to access of the software solution by the users.

In the example, enterprise client manager system 320 includes migration task list generator system 100. In one example, a manager, such as an administrator or service provider, for a software solution interacts with migration task list generator system 100 to specify one or more of current physical topology 112, solution changes 114, migration strategies 116, and product support information 118. In one example, migration task list generator system 100 may include interfaces through which a manager of the software solution enters parameters for specifying current physical topology 112, solution changes 114, migration strategies 116, and product support information 118. In another example, migration task list generator system 100 may analyze settings within network environment 300 to detect one or more parameters of current physical topology 112. In addition, in another example, migration task list generator system 100 may access product support information 118 from one or more product servers, such as product server 350 with software product updates 352, and provide the manager with a list of available solution changes and recommended solution changes. In addition, in another example, migration task list generator system 100 may sample and analyze user access to a particular deployed software solution and recommend one or more migration strategies 116.

Migration task list generator system 100 analyzes current physical topology 116, solution changes 114, migration strategies 116, and product support information to generate migration task list 122 with a set of migration tasks that if performed would yield changes within network environment 300 reflected in recommended physical topology 120. In particular, migration strategies 116 are selected at one or more of a product level and a software solution level. A manager of a software solution for an enterprise client may request to generate a first set of migration tasks and a first recommended topology based on a first selection of migration strategies and may request to generate a second set of migration tasks and a second recommended topology based on a second selection of migration strategies, wherein the manager may further request a comparison of the costs, downtime, hardware requirements and other factors distinguishing the first set of migration tasks and first recommended topology from the second set of migration tasks and second recommended topology, in determining which migration strategy to implement.

In one example, the manager may select a migration software solution level strategy of "migrate in place", which specifies a strategy for performing the changes specified in solution changes 114 without migrating software components to a new machine. In a "migrate in place" example, migration task list generator system 100 generates a set of migration tasks for upgrading software solution components 312 on machine 1 310 during the migration. By implementing a "migrate in place" strategy, an enterprise client may update a software solution without adding additional hardware, however, a user accessing the software solution via client system 340 may experience downtime as the software solution is upgraded.

In another example, the manager may select a migration software solution level strategy of "install new and migrate data", which specifies a strategy for performing the changes specified in solution changes 114 by installing software components specified for upgrade on a new machine and moving the data associated with the upgraded software components to the new machine. In a "install new and migrate data" example, migration task list generator system 100 generates a set of migration tasks for installing an upgraded version of one or more software solution components 312 on machine 2 330, as software solution components 332, for moving a copy of the data associated with one or more software solution components 312 from machine 1 310 to machine 2 330, and for uninstalling one or more software solution components 312. By implementing a "install new and migrate data" migration strategy, a user accessing a software solution through client system 340 may experience little or no downtime, however additional hardware may need to be implemented.

In one example, the manager may select a migration software solution level strategy of "run old and new in parallel", which specifies a strategy for performing the changes specified in solution changes 114 by installing software components specified for upgrade on a new machine, moving the data associated with the upgraded software components to the new machine, but maintaining a version of the software components and associated data on the current machine. In a "run old and new in parallel" example, migration task list generator system 100 generates a set of migration tasks for installing an upgraded version of one or more software solution components 312 on machine 2 330, as software solution components 332, for moving a copy of the data associated with one or more software solution components 312 from machine 1 310 to machine 2 330, and for maintaining software solution components 312 on machine 1 310 without upgrading the components. By implementing a "run old and new in parallel" migration strategy, an enterprise client may maintain a current version of a software solution for access by a user currently accessing the software solution through client system 340 during the migration, such that no downtime is experienced by a current user.

In one example, the manager may select a migration software solution level strategy of "migrate in place", but also specify a product level strategy for a particular software solution component of "install new and migrate data", which specifies a strategy for performing the changes specified in solution changes 114 for first performing the migration strategy of "install new and migrate data" for the specified software solution component, and second applying the "migrate in place" strategy for the software solution migration. In a "install new and migrate data" example for a particular software product, an upgraded version of a particular software product within software solution components 312 is installed on machine 2 330, as software solution components 332, and the remaining software solution components 312 are upgraded on machine 1 310. By implementing an "install new and migrate data" migration strategy for a particular software product to be upgraded, but implementing a "migrate in place" migration strategy for the remaining software components to be upgraded, an enterprise client may select a first selection of downtime factors associated with "install new and migrate data" for a particular software product and select a second selection of downtime factors associated with "migrate in place" for the remaining software components to be upgraded.

FIG. 4 depicts a block diagram illustrating a customized set of tasks for an enterprise client migration software solution level strategy of migrating the software solution in place. In the example, in FIG. 4, a current physical topology 412 includes multiple software products specified on "machine 1", illustrated as software product A v(n) 414, software product B v(n) 416, and software prerequisite X v(n) 418. In the example, software prerequisite X v(n) 418 and software product A v(n) 414 have at least one dependency and software prerequisite X v(n) 418 and software product B v(n) 416 have at least one dependency. In the example, the enterprise client has specified solution changes 420 to include "upgrade product A" and "upgrade product B", requiring the upgrade of both software product A v(n) 414 and software product B v(n) 416.

In the example, the enterprise client has specified migration strategies 422 including a solution level strategy only of "migrate in place". A solution level strategy of "migrate in place" specifies a strategy that requires performing solution changes 420 on the same machine. Based on the migration strategy of "migrate in place", as illustrated, a recommended physical topology 430 generated by migration task list generator 110 illustrates the software products of the software solution upgraded on a same "machine 1" as referenced in current physical topology 412.

In the example, migration task list 440 illustrates a set of tasks recommended to be performed on the software solution described by current physical topology 412, and if performed, would yield recommended physical topology 430. In the example, the set of tasks are specified for "machine 1", per the solution level migration strategy of "migrate in place" in migration strategies 422.

Under migration task list 440, a set of tasks is specified for upgrading product X v(n) of software prerequisite X v(n) 418. In particular, the enterprise client has requested solution changes 420 including upgrades to product A and product B, however both of these products have at least one dependency with software perquisite X v(n), as illustrated in current physical topology 412. Migration task list 440 instructions specify "obtain product X v(n+1)", which is the product upgrade component for product X v(n), "upgrade software to product X v(n+1)", and "verify upgrade product X v(n+1)", which would yield software prerequisite X v(n+1) 436 in recommended physical topology 430.

In addition, under migration task list 440, a set of tasks is specified for upgrading product A v(n) of software product A v(n) 414. In particular, the enterprise client has requested solution changes 420 including upgrades to product A. Migration task list 440 instructions specify "obtain product A v(n+1)", which is the product upgrade component for product A v(n), "upgrade software to product A v(n+1)", and "verify upgrade product A v(n+1)", which would yield software product A v(n+1) 432 in recommended physical topology 430.

In addition, under migration task list 440, a set of tasks is specified for upgrading product B v(n) of software product B v(n) 416. In particular, the enterprise client has requested solution changes 420 including upgrades to product B. Migration task list 440 instructions specify "obtain product B v(n+1)", which is the product upgrade component for product B v(n), "upgrade software to product B v(n+1)", and "verify upgrade product B v(n+1)", which would yield software product B v(n+1) 434 in recommended physical topology 430.

FIG. 5 illustrates a block diagram depicting a customized set of tasks for an enterprise client migration software solution level strategy of install new and migrate data. In the example, in FIG. 5, a current physical topology 512 includes multiple software products specified on "machine 1", illustrated as software product A v(n) 514, software product B v(n) 516, and software prerequisite X v(n) 518. In the example, software prerequisite X v(n) 518 and software product A v(n) 514 have at least one dependency and software prerequisite X v(n) 518 and software product B v(n) 516 have at least one dependency. In the example, the enterprise client has specified solution changes 520 to include "upgrade product A", requiring the upgrade of software product A v(n) 514.

In the example, the enterprise client has specified migration strategies 522 including a solution level strategy only of "install new and migrate data". A solution level strategy of "install new and migrate data" specifies a strategy that requires performing solution changes 520 on a new machine, and migrating the data associated upgraded software products to the new machine. Based on the migration strategy of "install new and migrate data", as illustrated, a recommended physical topology 530 generated by migration task list generator 110 illustrates the software solution comprising upgraded software products on a new "machine 2" and existing software products remaining on "machine 1".

In the example, migration task list 540 illustrates a set of tasks recommended to be performed on the software solution described by current physical topology 512, and if performed, would yield recommended physical topology 530. In the example, the set of tasks are specified for "machine 1" and "machine 2" per the solution level migration strategy of "install new and migrate data" in migration strategies 522.

Under migration task list 540, a set of tasks are specified for "machine 1" for product X v(n) of software prerequisite X v(n) 518 and for product A v(n) of software product A v(n) 514. In particular, the enterprise client has requested solution changes 520 including an upgrade to product A, however this product has at least one dependency with software perquisite X v(n), as illustrated in current physical topology 512. Because migration strategies 522 specifies "migrate data", migration task list 540 instructions for "machine 1" specify for product X v(n) "offload data for product X v(n)" and specify for product A v(n) "offload data for product A v(n)", such that the data associated with product X v(n) and product A v(n) can be migrated when upgrading product X v(n) and product A v(n).

In addition, under migration task list 540, a set of tasks are specified for a new "machine 2" for product X v(n+1), which is an upgrade of software prerequisite X v(n) 518, and for product A v(n+1), which is an upgrade of software product A v(n) 514. In the example, migration task list 540 includes the instructions "obtain product X v(n+1)", which is the product upgrade component for product X v(n), "install product X v(n+1)", "load data for product X v(n)", which loads the offloaded data to migrate the data associated with product X v(n) on new "machine 2", and "verify install product X v(n+1)", which would yield software prerequisite X v(n+1) 538 in recommended physical topology 530. In addition, in the example, migration task list 540 includes the instructions "obtain product A v(n+1)", which is the product upgrade component for product A v(n), "install product A v(n+1)", "load data for product A v(n)", which loads the offloaded data to migrate the data associated with product A v(n) on new "machine 2", "configure to work with product X v(n+1)", and "verify install product A v(n+1)", which would yield software prerequisite A v(n+1) 536 in recommended physical topology 530.

In addition, under migration task list 540, a set of tasks are specified for finishing the upgrade of product A, including a last task specified for "machine 1" for product A v(n) of "uninstall product A v(n)". As illustrated, the completion of the set of tasks illustrated in migration task list 540 yields recommended physical topology 530 of an upgraded software solution with "machine 1" still including software product B v(n) 532 and software prerequisite X v(n) 534 and with "machine 2" including upgraded software product A v(n+1) 536 and software prerequisite X v(n+1) 538.

FIG. 6 depicts a block diagram illustrating a customized set of tasks for an enterprise client migration software solution level strategy of run the old and new version of a software solution in parallel. In the example, in FIG. 6, a current physical topology 612 includes multiple software products specified on "machine 1", illustrated as software product A v(n) 614 and software prerequisite X v(n) 618. In the example, software prerequisite X v(n) 618 and software product A v(n) 614 have at least one dependency. In the example, the enterprise client has specified solution changes 620 to include "upgrade product A", requiring the upgrade of software product A v(n) 614.

In the example, the enterprise client has specified migration strategies 622 including a solution level strategy only of "run old and new in parallel". A solution level strategy of "run old and new in parallel" specifies a strategy that requires performing solution changes 620 on a new machine, and maintaining a version of the currently deployed products in parallel on the original machine. Based on the migration strategy of "run old and new in parallel", as illustrated, a recommended physical topology 630 generated by migration task list generator 110 illustrates the software solution comprising upgraded software products on a new "machine 2" and the existing software products, without an upgrade, remaining on "machine 1".

In the example, migration task list 640 illustrates a set of tasks recommended to be performed on the software solution described by current physical topology 612, and if performed, would yield recommended physical topology 630. In the example, the set of tasks are specified for "machine 1" and "machine 2" per the solution level migration strategy of "run old and new in parallel" in migration strategies 622.

Under migration task list 640, a set of tasks are specified for "machine 1" for product X v(n) of software prerequisite X v(n) 618 and for product A v(n) of software product A v(n) 614. In particular, the enterprise client has requested solution changes 620 including an upgrade to product A, however this product has at least one dependency with software perquisite X v(n), as illustrated in current physical topology 612. Because migration strategies 622 specifies "run old and new in parallel", migration task list 640 instructions for "machine 1" specify for product X v(n) "offload data for product X v(n)" and specify for product A v(n) "offload data for product A v(n)", such that the data associated with product X v(n) and product A v(n) can be migrated when upgrading product X v(n) and product A v(n).

In addition, under migration task list 640, a set of tasks are specified for a new "machine 2" for product X v(n+1), which is an upgrade of software prerequisite X v(n) 618, and for product A v(n+1), which is an upgrade of software product A v(n) 614. In the example, migration task list 640 includes the instructions "obtain product X v(n+1)", which is the product upgrade component for product X v(n), "install product X v(n+1)", "load data for product X v(n)", which loads the offloaded data to migrate the data associated with product X v(n) on new "machine 2", "configure for data synchronization with product X v(n) on machine 1", which enables software prerequisite X v(n+1) 638 to run in parallel with software prerequisite X v(n) 634, and "verify install product X v(n+1)", which would yield software prerequisite X v(n+1) 638 in recommended physical topology 630. In addition, in the example, migration task list 640 includes the instructions "obtain product A v(n+1)", which is the product upgrade component for product A v(n), "install product A v(n+1)", "load data for product A v(n)", which loads the offloaded data to migrate the data associated with product A v(n) on new "machine 2", "configure for data synchronization with product A v(n) on machine 1", "configure to work with product X v(n+1)", and "verify install product A v(n+1)", which would yield software prerequisite A v(n+1) 636 in recommended physical topology 630.

As illustrated, the completion of the set of tasks illustrated in migration task list 640 yields recommended physical topology 630 of an upgraded software solution with "machine 1" still including software product A v(n) 632 and software prerequisite X v(n) 634 and with "machine 2" including upgraded software product A v(n+1) 636 and software prerequisite X v(n+1) 638.

Figure 7:
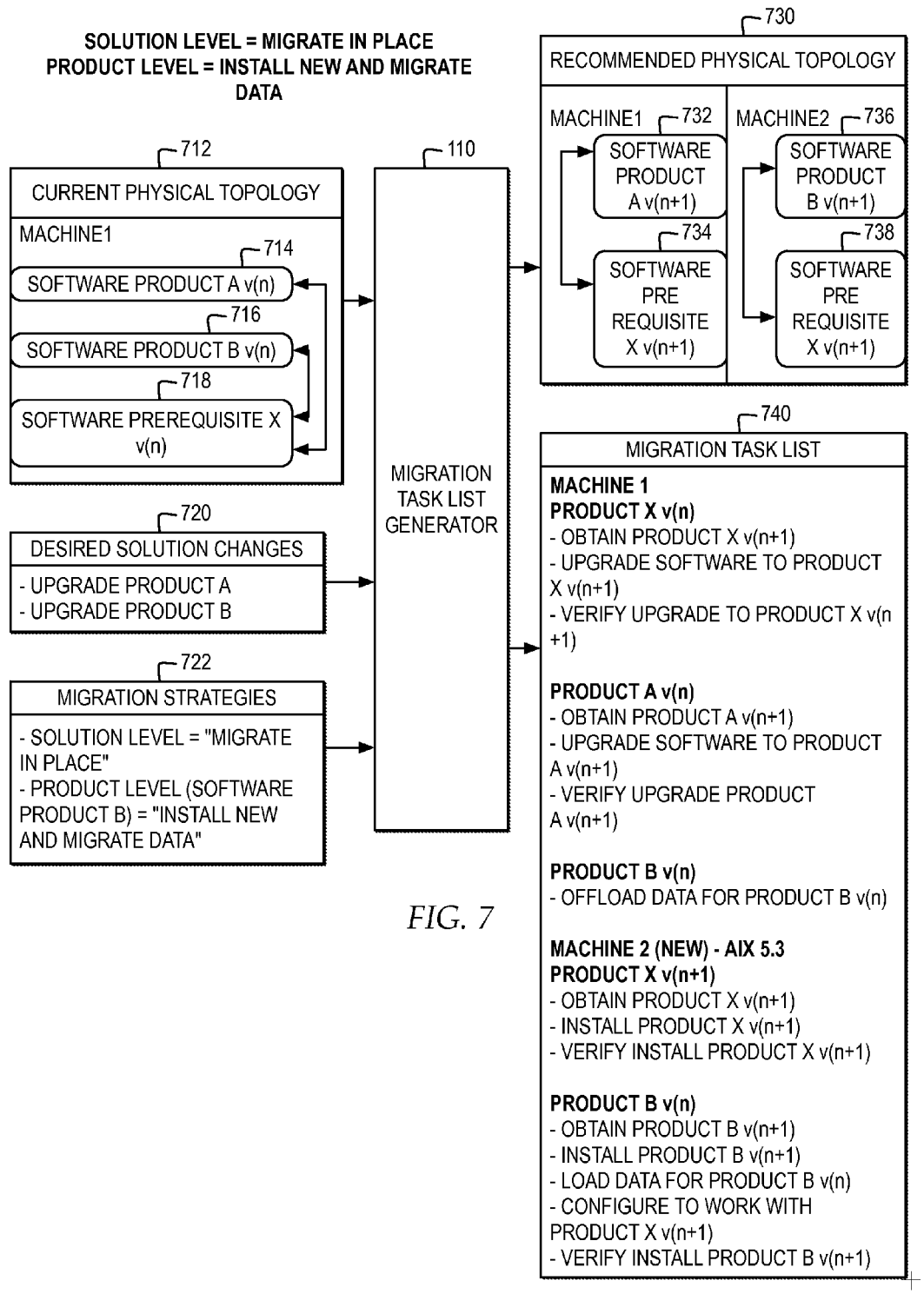
FIG. 7 illustrates a block diagram depicting a customized set of tasks for an enterprise client migration software solution level strategy of migrating the software solution in place and a client migration product level strategy of install new and migrate data.

FIG. 7 illustrates a block diagram depicting a customized set of tasks for an enterprise client migration software solution level strategy of migrating the software solution in place and an enterprise client migration product level strategy of install new and migrate data. In the example, in FIG. 7, a current physical topology 712 includes multiple software products specified on "machine 1", illustrated as software product A v(n) 714, software product B v(n) 716, and software prerequisite X v(n) 718. In the example, software prerequisite X v(n) 718 and software product A v(n) 714 have at least one dependency and software prerequisite X v(n) 718 and software product B v(n) 716 have at least one dependency. In the example, the enterprise client has specified solution changes 720 to include "upgrade product A" and "upgrade product B", requiring the upgrade of both software product A v(n) 714 and software product B v(n) 716.

In the example, the enterprise client has specified migration strategies 722 including a solution level strategy only of "migrate in place" and a product level strategy of "install new and migrate data". A solution level strategy of "migrate in place" specifies a strategy that requires performing solution changes 720 on the same machine, however, a product level strategy of "install new and migrate data" specifies a product level strategy overrides the solution level strategy and requires performing solution changes 720 on a new machine and migrating the data associated with the upgraded product solution.

Based on the solution level migration strategy of "migrate in place", as illustrated, a recommended physical topology 730 generated by migration task list generator 110 illustrates upgrading product A, and software prerequisite X, of the software solution on a same "machine 1". In the example, migration task list 740 illustrates a set of tasks recommended to be performed on the software solution described by current physical topology 712, but not on software product B v(n) 716, and if performed would yield software product A v(n+1) 732 and software prerequisite X v(n+1) 734 on "machine 1".

Under migration task list 740, a set of tasks is specified for upgrading product X v(n) of software prerequisite X v(n) 718. In particular, the enterprise client has requested solution changes 720 including upgrades to product A, however this product has at least one dependency with software prerequisite X v(n), as illustrated in current physical topology 712. Migration task list 740 instructions specify "obtain product X v(n+1)", which is the product upgrade component for product X v(n), "upgrade software to product X v(n+1)", and "verify upgrade product X v(n+1)", which would yield software prerequisite X v(n+1) 734 in recommended physical topology 730.

In addition, under migration task list 740, a set of tasks is specified for upgrading product A v(n) of software product A v(n) 714. In particular, the enterprise client has requested solution changes 720 including upgrades to product A. Migration task list 740 instructions specify "obtain product A v(n+1)", which is the product upgrade component for product A v(n), "upgrade software to product A v(n+1)", and "verify upgrade product A v(n+1)", which would yield software product A v(n+1) 732 in recommended physical topology 730.

Next, based on the product level migration of "install new and migrate data", as illustrated, recommended physical topology 730 generated by migration task list generator 110 illustrates upgrading product B, and software prerequisite X, of the software solution on a new "machine 2". In the example, migration task list 740 illustrates a set of tasks recommended to be performed on software product B v(n) 716 and software prerequisite X v(n) 718, and if performed would yield software product B v(n+1) 736 and software prerequisite X v(n+1) 738 on "machine 2".

In addition, under migration task list 740, a set of tasks are specified for upgrading product B v(n) of software product B v(n) 416, according to the migration strategy of "install new and migrate data." In particular, the enterprise client has requested solution changes 720 including upgrades to product B. Migration task list 740 instructions for "machine 1" specify "offload data for product B v(n)".

In addition, under migration task list 740, a set of tasks are specified for a new "machine 2" for product X v(n+1), which is an upgrade of software prerequisite X v(n) 718, and for product B v(n+1), which is an upgrade of software product B v(n) 716. In the example, migration task list 740 includes the instructions "obtain product X v(n+1)", which is the product upgrade component for product X v(n), "install product X v(n+1)", and "verify install product X v(n+1)", which would yield software prerequisite X v(n+1) 738 in recommended physical topology 730. In addition, in the example, migration task list 740 includes the instructions "obtain product B v(n+1)", which is the product upgrade component for product B v(n), "install product B v(n+1)", "load data for product B v(n)", which loads the offloaded data to migrate the data associated with product B v(n) on new "machine 2", "configure to work with product X v(n+1)", and "verify install product B v(n+1)", which would yield software prerequisite B v(n+1) 736 in recommended physical topology 730.

FIG. 8 depicts a high-level logic flowchart of a process and program for generating a customized set of tasks for migration of a deployed software solution. In the example, the process starts at block 800 and thereafter proceeds to block 802. Block 802 illustrates specifying a current physical topology for a software solution. Next, block 804 depicts specifying at least one requested software solution change. Next, block 806 illustrates specifying at least one migration strategy, including at least one of a solution level strategy and a product level strategy. Next, block 808 depicts specifying product support information for at least one software component of the software solution. Next, block 810 illustrates applying the migration strategy for the requested software solution changes for the product level strategy to override the solution level strategy. Next, block 812 depicts generating a set of migration tasks for making the requested software solution changes for the current physical topology based on the specified migration strategy while also applying practices specified in the product support information. Next, block 814 illustrates generating a recommended physical topology which performing the set of migration tasks would yield. Next, block 816 depicts outputting the set of migration tasks and recommended physical topology. Next, block 818 illustrates analyzing the set of migration tasks and recommended physical topology, for the specified migration strategy, in comparison with another set of migration tasks and recommended physical topology, for a different migration strategy, to determine at least one difference in business cost for the different migration strategies. Next, block 820 depicts outputting the comparison of the sets of migration tasks, recommended physical topologies, and business costs for the differing migration strategies, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for generating a set of tasks for performing a migration of a software solution comprising:
   receiving, by at least one computer system, a current physical topology of a deployed software solution, wherein the deployed software solution comprises a plurality of software components and data associated with the plurality of software components integrated into a single entity;

receiving, by the at least one computer system, at least one solution change to the deployed software solution to meet at least one business requirement;

selecting, by the at least one computer system, a plurality of migration strategies for migrating the deployed software solution, wherein each of the plurality of migration strategies comprises at least one product level strategy applicable for a particular software component of the plurality of software components and at least one solution level strategy applicable for the plurality of software components, wherein the product level strategy overrides the solution level strategy for the particular software component, wherein each of the plurality of migration strategies has a separate downtime effect for the deployed software solution during migration and a separate hardware requirement;

generating, by the at least one computer system, a first plurality of migration tasks for performing the at least one solution change to the deployed software solution of the current physical topology, wherein the plurality of migration tasks apply a first migration strategy with a first downtime effect and a first hardware requirement from among the plurality of migration strategies;

generating, by the at least one computer system, a recommendation of a first future physical topology for the received software solution, wherein the recommended first future physical topology is updated according to the first plurality of migration tasks, wherein one task of the plurality of migration tasks is associated with a machine;

outputting, by the at least one computer system, the first plurality of migration tasks and recommended first future physical topology, the outputting further illustrating a simulated plan for migrating the software solution according to the at least one migration strategy and meeting the at least one business requirement;

generating, by the at least one computer system, a second plurality of migration tasks for performing the at least one solution change to the deployed software solution specified in the current physical topology, wherein the plurality of migration tasks apply a second migration strategy from among the plurality of migration strategies, the second migration strategy applied with a second downtime effect and a second hardware requirement from among the plurality of migration strategies;

generating, by the at least one computer system, a recommendation of a second future physical topology for the received software solution, wherein the recommended second future physical topology is updated according to the second plurality of migration tasks;

analyzing, by the at least one computer system, the first plurality of migration tasks, the recommended first future physical topology, the second plurality of migration tasks, and the recommended second future physical topology to identify at least one time difference between the first downtime effect and second downtime effect and to identify at least one hardware difference between the first hardware requirement and the second hardware requirement;

comparing, by the at least one computer system, a business cost between the first migration strategy and the second migration strategy, while taking into account the at least one time difference and the at least one hardware difference, thereby generating at least one business cost difference;

outputting, by the at least one computer system, the at least one business cost difference between the first migration strategy and the second migration strategy;

evaluating, by the at least one computer system, the business cost difference for the deployed software solution;

selecting, by the at least one computer system, based on the evaluated business cost difference, one of the first migration strategy and the second migration strategy, as a suitable migration strategy; and executing, by the at least one computer system, a selection of migration tasks associated with the selected suitable migration strategy for the deployed software solution, the selection of migration tasks comprising one of the first plurality of migration tasks and the second plurality of migration tasks.

2. The method according to claim 1, further comprising:
selecting, by the at least one computer system, the plurality of migration strategies comprising the first migration strategy to migrate the software solution in place, wherein the first downtime effect is longer than the second downtime effect and the first hardware requirement is less than the second hardware requirement; and generating, by the at least one computer system, the first plurality of migration tasks for performing the at least one solution change to the software solution on a same machine currently comprising the software solution, as specified for the software solution in the recommended first future physical topology, wherein the first downtime effect comprises bringing the same machine down, applying the solution change to the same machine, and restarting the same machine.

3. The method according to claim 1, further comprising:
selecting, by the at least one computer system, the plurality of migration strategies comprising the second migration strategy to install the upgraded version of the at least one software component of the plurality of software components on at least one new machine and migrate the data associated with the at least one software component to the at least one new machine, wherein the second downtime effect is less than the first downtime effect and the second hardware requirement of the at least one new machine is more than the first hardware requirement; and generating, by the at least one computer system, the second plurality of migration tasks, wherein the second plurality of migration tasks comprise at least one task for:
performing, by the at least one computer system, the at least one solution change to the software solution on the at least one new machine; and
migrating, by the at least one computer system, the data associated with the at least one software component to the at least one new machine.

4. The method according to claim 1, further comprising:
specifying, by the at least one computer system, the second migration strategy to install the upgraded version of the at least one software component of the plurality of software components on at least one new machine and to keep the current version of the at least one software component on a current machine specified in the current physical topology, wherein the second downtime effect is less than the first downtime effect and the second hardware requirement of the at least one new machine is more than the first hardware requirement; and generating, by the at least one computer system, the second plurality of migration tasks, wherein the second plurality of migration tasks comprise at least one task for:
performing, by the at least one computer system, the at least one solution change to the software solution on the at least one new machine; and
maintaining, by the at least one computer system, the current version of the at least one software component on the current machine.

5. The method according to claim 4, further comprising:
generating, by the at least one computer system, the second plurality of migration tasks, wherein the second plurality of migration tasks comprise at least one additional task for:
moving, by the at least one computer system, a copy of the data associated with the at least one software component to the at least one new machine;
keeping, by the at least one computer system, a current version of the data on the current machine; and
synchronizing, by the at least one computer system, the copy of the data with the current version of the data.

6. The method according to claim 4, further comprising:
generating, by the at least one computer system, the second plurality of migration tasks, wherein the second plurality of migration tasks comprise at least one additional task for:
maintaining, by the at least one computer system, the data associated with the at least one software component on the current machine; and
sharing, by the at least one computer system, the data between the upgraded version of the at least one software component and the current version of the at least one software component.

7. The method according to claim 4, further comprising:
generating, by the at least one computer system, the second plurality of migration tasks, wherein the second plurality of migration tasks comprise at least one additional task for:
moving, by the at least one computer system, a copy of the data associated with the at least one software component to the at least one new machine; and
keeping, by the at least one computer system, a current version of the data on the current machine.

8. The method according to claim 1, further comprising:
selecting, by the at least one computer system, the plurality of migration strategies comprising the second migration strategy with the product level strategy specified to migrate a particular software component and its associated data to another machine and with the solution level strategy specified to migrate the software solution in place;
applying, by the at least one computer system, the product level strategy to override the solution level strategy for the particular software component; and
generating, by the at least one computer system, the second plurality of migration tasks, wherein the second plurality of migration tasks comprise at least one task for:
performing, by the at least one computer system, the at least one solution change to the particular software component on at least one new machine;
migrating, by the at least one computer system, the data associated with the particular software component to the at least one new machine, excluding the particular software component from at least one remaining change specified in the at least one solution change; and
performing, by the at least one computer system, the at least one remaining change on a same machine originally comprising the software solution, as specified for the software solution as originally specified in the current physical topology.

9. The method according to claim 1, further comprising:
accessing, by the at least one computer system, at least one recommended upgrade approach for at least one component of the software solution; and
generating, by the at least one computer system, the second plurality of migration tasks for performing the at least one solution change to the deployed software solution specified in the recommended second future physical topology, wherein the at least one solution change is based on the second migration strategy to perform in accordance with the at least one recommended upgrade approach.

10. The method according to claim 1, further comprising:
specifying, by the at least one computer system, the current physical topology of the deployed software solution for an enterprise client comprising at least one dependency between a first software component of the plurality of software components and a second software component of the plurality of software components;
receiving, by the at least one computer system, specifications for at least one solution change to the first software component of the deployed software solution to meet the at least one business requirement of the enterprise client;
generating, by the at least one computer system, the first plurality of migration tasks for performing the at least one solution change to the first software component of the deployed software solution comprising a first selection of tasks for migrating the first software component according to the first migration strategy and a second selection of tasks for migrating the second software component according to the first migration strategy; and
generating, by the at least one computer system, the recommended first future physical topology yielded for the software solution if the physical topology is updated according to the first plurality of migration tasks, wherein the recommended future physical topology comprises the dependency between an upgraded version of the first software component and the second software component, wherein the upgraded version of the first software component is based on the first selection of tasks.

11. A computer system for generating a set of tasks for performing a migration of a software solution, the system comprising:
a migration task list generator coupled to at least one processor and memory;
the migration task list generator programmed to:
receive a current physical topology of a deployed software solution, wherein the deployed software solution comprises a plurality of software components and data associated with the plurality of software components integrated into a single entity;
receive at least one solution change to the deployed software solution to meet at least one business requirement;
select a plurality of migration strategies for migrating the deployed software solution, wherein each of the plurality of migration strategies comprises at least one product level strategy applicable for a particular software component of the plurality of software components and at least one solution level strategy applicable for the plurality of software components, wherein the product level strategy overrides the solution level strategy for the particular software component, wherein each of the plurality of migration strategies has a separate downtime effect for the deployed software solution during migration and a separate hardware requirement;

generate a first plurality of migration tasks for performing the at least one solution change to the deployed software solution of the current physical topology, wherein the plurality of migration tasks apply a first migration strategy with a first downtime effect and a first hardware requirement from among the plurality of migration strategies;

generate a recommendation of a first future physical topology for the received software solution, wherein the recommended first future physical topology is updated according to the first plurality of migration tasks, wherein one task of the plurality of migration tasks is associated with a machine;

output the first plurality of migration tasks and recommended first future physical topology, the outputting further illustrating a simulated plan for migrating the software solution according to the at least one migration strategy and meeting the at least one business requirement;

generate a second plurality of migration tasks for performing the at least one solution change to the deployed software solution specified in the current physical topology, wherein the plurality of migration tasks apply a second migration strategy from among the plurality of migration strategies, the second migration strategy applied with a second downtime effect and a second hardware requirement from among the plurality of migration strategies;

generate a recommendation of a second future physical topology for the received software solution, wherein the recommended second future physical topology is updated according to the second plurality of migration tasks;

analyze the first plurality of migration tasks, the recommended first future physical topology, the second plurality of migration tasks, and the recommended second future physical topology to identify at least one time difference between the first downtime effect and second downtime effect and to identify at least one hardware difference between the first hardware requirement and the second hardware requirement;

compare a business cost between the first migration strategy and the second migration strategy, while taking into account the at least one time difference and the at least one hardware difference, thereby generating at least one business cost difference;

output at least one business cost difference between the first migration strategy and the second migration strategy;

evaluate the business cost difference for the deployed software solution;

select, based on the evaluated business cost difference, one of the first migration strategy and the second migration strategy, as a suitable migration strategy; and execute a selection of migration tasks associated with the selected suitable migration strategy for the deployed software solution, the selection of migration tasks comprising one of the first plurality of migration tasks and the second plurality of migration tasks.

12. The system according to claim 11, the migration task list generator further programmed to:

select the plurality of migration strategies comprising the first migration strategy to migrate the software solution in place, wherein the first downtime effect is longer than the second downtime effect and the first hardware requirement is less than the second hardware requirement; and generate the first plurality of migration tasks for performing the at least one solution change to the software solution on a same machine currently comprising the software solution, as specified for the software solution in the recommended first future physical topology, wherein the first downtime effect comprises bringing the same machine down, applying the solution change to the same machine, and restarting the same machine.

13. The system according to claim 11, the migration task list generator further programmed to:

select the plurality of migration strategies comprising the second migration strategy to install the upgraded version of the at least one software component of the plurality of software components on at least one new machine and migrate the data associated with the at least one software component to the at least one new machine, wherein the second downtime effect is less than the first downtime effect and the second hardware requirement of the at least one new machine is more than the first hardware requirement; and generate the second plurality of migration tasks, wherein the second plurality of migration tasks comprise at least one task for:

perform the at least one solution change to the software solution on the at least one new machine; and migrating the data associated with the at least one software component to the at least one new machine.

14. The system according to claim 11, the migration task list generator further programmed to:

specify the second migration strategy to install the upgraded version of the at least one software component of the plurality of software components on at least one new machine and to keep the current version of the at least one software component on a current machine specified in the current physical topology, wherein the second downtime effect is less than the first downtime effect and the second hardware requirement of the at least one new machine is more than the first hardware requirement; and generate the second plurality of migration tasks, wherein the second plurality of migration tasks comprise at least one task for:

performing the at least one solution change to the software solution on the at least one new machine; and maintaining the current version of the at least one software component on the current machine.

15. The system according to claim 14, the migration task list generator further programmed to:

generate the second plurality of migration tasks, wherein the second plurality of migration tasks comprise at least one additional task for:

moving a copy of the data associated with the at least one software component to the at least one new machine;

keeping a current version of the data on the current machine; and synchronizing the copy of the data with the current version of the data.

16. The system according to claim 14, the migration task list generator further programmed to:

generate the second plurality of migration tasks, wherein the second plurality of migration tasks comprise at least one additional task for:
maintaining the data associated with the at least one software component on the current machine; and
sharing the data between the upgraded version of the at least one software component and the current version of the at least one software component.

17. The system according to claim 14, the migration task list generator further programmed to:
generate the second plurality of migration tasks, wherein the second plurality of migration tasks comprise at least one additional task for:
moving a copy of the data associated with the at least one software component to the at least one new machine; and
keeping a current version of the data on the current machine.

18. The system according to claim 11, the migration task list generator further programmed to:
select the plurality of migration strategies comprising the second migration strategy with the product level strategy specified to migrate a particular software component and its associated data to another machine and with the solution level strategy specified to migrate the software solution in place;
apply the product level strategy to override the solution level strategy for the particular software component; and
generate the second plurality of migration tasks, wherein the second plurality of migration tasks comprise at least one task for:
performing the at least one solution change to the particular software component on the at least one new machine;
migrating the data associated with the particular software component to the at least one new machine, excluding the particular software component from at least one remaining change specified in the at least one solution change; and
performing the at least one remaining change on a same machine originally comprising the software solution, as specified for the software solution as originally specified in the current physical topology.

19. The system according to claim 11, the migration task list generator further programmed to:
access at least one recommended upgrade approach for at least one component of the software solution; and
generate the second plurality of migration tasks for performing the at least one solution change to the deployed software solution specified in the recommended second future physical topology, wherein the at least one solution change is based on the second migration strategy to perform in accordance with the at least one recommended upgrade approach.

20. A computer program product for generating a set of tasks for performing a migration of a software solution, the computer program product comprising a non-transitory computer readable storage medium having program instructions embodied therewith, the program instructions executable by a processor to cause the processor to:
receive, by the processor, a current physical topology of a deployed software solution, wherein the deployed software solution comprises a plurality of software components and data associated with the plurality of software components integrated into a single entity;
receive, by the processor, at least one solution change to the deployed software solution to meet at least one business requirement;
select, by the processor, a plurality of migration strategies for migrating the deployed software solution, wherein each of the plurality of migration strategies comprises at least one product level strategy applicable for a particular software component of the plurality of software components and at least one solution level strategy applicable for the plurality of software components, wherein the product level strategy overrides the solution level strategy for the particular software component, wherein each of the plurality of migration strategies has a separate downtime effect for the deployed software solution during migration and a separate hardware requirement;
generate, by the processor, a first plurality of migration tasks for performing the at least one solution change to the deployed software solution of the current physical topology, wherein the plurality of migration tasks apply a first migration strategy with a first downtime effect and a first hardware requirement from among the plurality of migration strategies;
generate, by the processor, a recommendation of a first future physical topology for the received software solution, wherein the recommended first future physical topology is updated according to the first plurality of migration tasks, wherein one task of the plurality of migration tasks is associated with a machine;
output, by the processor, the first plurality of migration tasks and recommended first future physical topology, the outputting further illustrating a simulated plan for migrating the software solution according to the at least one migration strategy and meeting the at least one business requirement;
generate, by the processor, a second plurality of migration tasks for performing the at least one solution change to the deployed software solution specified in the current physical topology, wherein the plurality of migration tasks apply a second migration strategy from among the plurality of migration strategies, wherein the plurality of migration tasks apply a second migration strategy with a second downtime effect and a second hardware requirement from among the plurality of migration strategies;
generate, by the processor, a recommendation of a second future physical topology for the received software solution, wherein the recommended second future physical topology is updated according to the second plurality of migration tasks;
analyze, by the processor, the first plurality of migration tasks, the recommended first future physical topology, the second plurality of migration tasks, and the recommended second future physical topology to identify at least one time difference between the first downtime effect and second downtime effect and to identify at least one hardware difference between the first hardware requirement and the second hardware requirement;
compare, by the processor, a business cost between the first migration strategy and the second migration strategy, while taking into account the at least one time difference and the at least one hardware difference, thereby generating at least one business cost difference;
output, by the processor, at least one business cost difference between the first migration strategy and the second migration strategy;

evaluate, by the processor, the business cost difference for the deployed software solution;

select, by the processor, based on the evaluated business cost difference, one of the first migration strategy and the second migration strategy, as a suitable migration strategy; and execute, by the processor, a selection of migration tasks associated with the selected suitable migration strategy for the deployed software solution, the selection of migration tasks comprising one of the first plurality of migration tasks and the second plurality of migration tasks.

\* \* \* \* \*